B. R. BENJAMIN.
GRAIN DISTRIBUTING MECHANISM.
APPLICATION FILED JAN. 17, 1916.
1,312,302.
Patented Aug. 5, 1919.
2 SHEETS—SHEET 1.
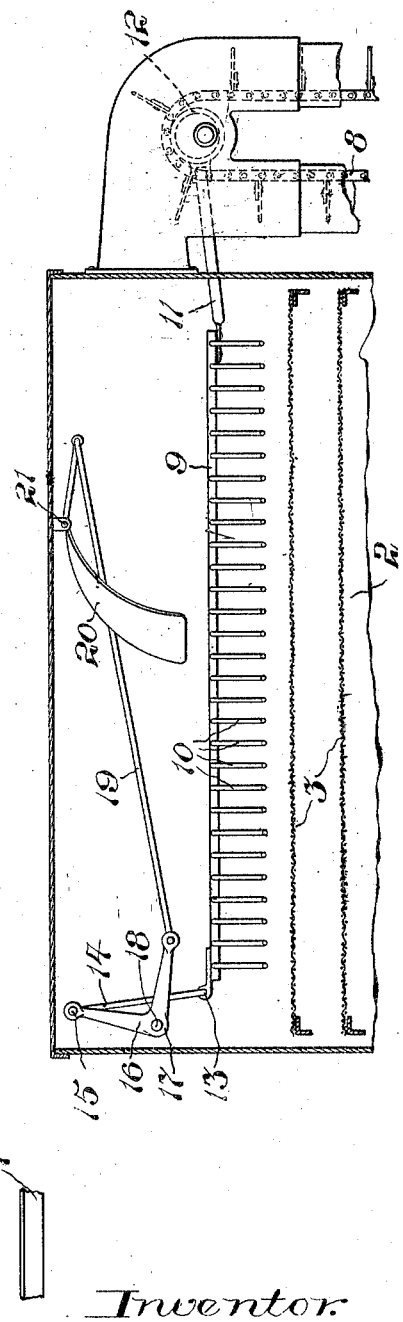
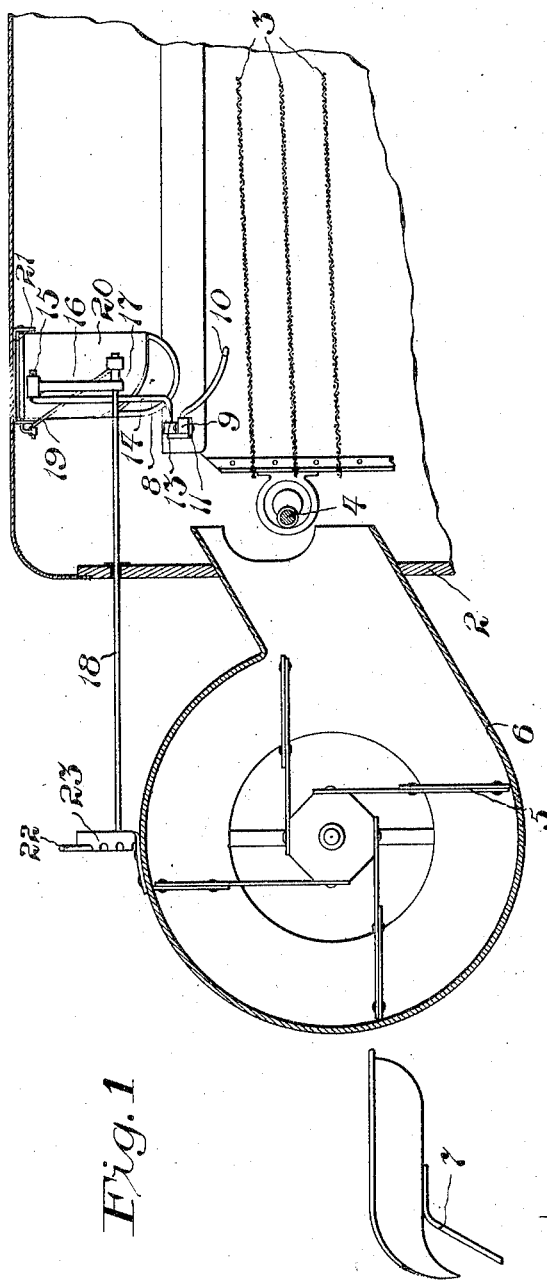
Inventor.
Bert R. Benjamin.
By
Atty B. R. BENJAMIN.
GRAIN DISTRIBUTING MECHANISM.
APPLICATION FILED JAN. 17, 1916.
1,312,302.
Patented Aug. 5, 1919.
2 SHEETS—SHEET 2.
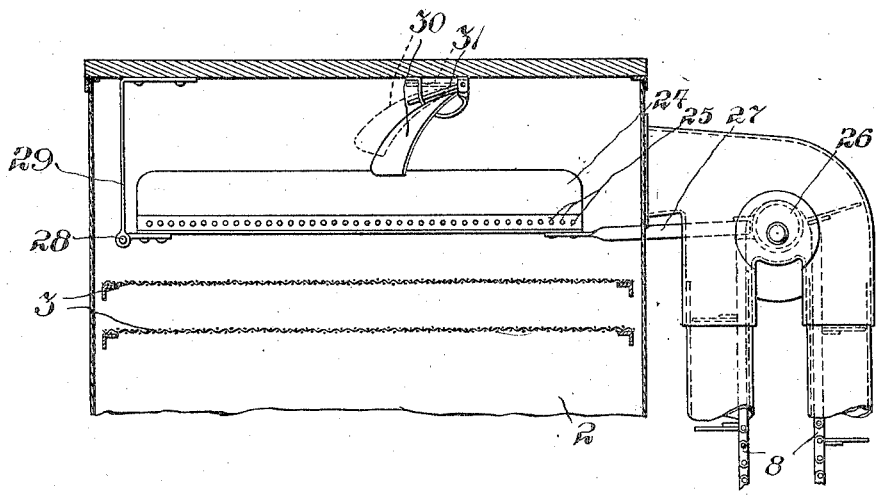
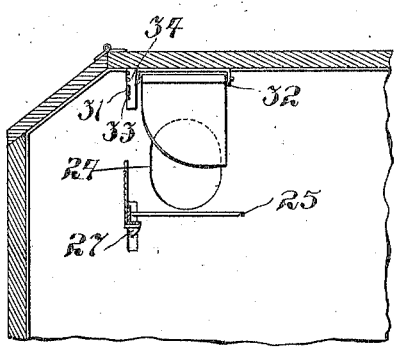
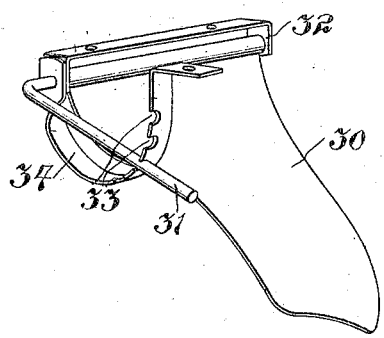
Inventor.
Bert R. Benjamin.
By Chas. E. Lord
Atty.

UNITED STATES PATENT OFFICE.

BERT R. BENJAMIN, OF OAK PARK, ILLINOIS, ASSIGNOR, BY MESNE ASSIGNMENTS, TO INTERNATIONAL HARVESTER COMPANY, A CORPORATION OF NEW JERSEY.

GRAIN-DISTRIBUTING MECHANISM.

1,312,302.     Specification of Letters Patent.     Patented Aug. 5, 1919.

Application filed January 17, 1916. Serial No. 72,509.

*To all whom it may concern:*

Be it known that I, BERT R. BENJAMIN, a citizen of the United States, residing at Oak Park, in the county of Cook and State of Illinois, have invented certain new and useful Improvements in Grain - Distributing Mechanism, of which the following is a full, clear, and exact specification.

My invention relates to grain distributing mechanism.

It has for its object to provide an improved mechanism whereby the grain delivered from an elevator to a separator is evenly distributed over the screens thereof. A more specific object of my invention is to provide a grain distributing mechanism particularly adapted to use in connection with harvester threshers which will spread the grain evenly upon the surfaces of the screens, even when the machine is on a side hill. I attain these objects by the provision of improved means for deflecting and spreading the grain over the surface of the screen, all as hereinafter more fully set forth.

In the accompanying drawings I have, for purposes of illustration, shown two embodiments which my invention may assume in practice.

In these drawings:

Figure 1 is a longitudinal sectional view of a portion of a harvester thresher equipped with my improvement.

Fig. 2 is a detail end elevation of the distributing mechanism, the casing therefor being shown in section.

Fig. 3 is a partial sectional view of a modified form of my improved mechanism.

Fig. 4 is a side elevation of the mechanism shown in Fig. 3.

Fig. 5 is a detail perspective view of the deflector.

The harvester thresher shown may be of standard construction including a frame 1 having a separator box 2 thereon, in which parallel series of superimposed screens 3 are mounted, these screens being movable through an eccentric connection 4 driven from a moving part of the mechanism in a well known manner, and receiving the air blast from a fan 5 preferably carried in a suitable casing 6 at a point in front of the separator casing 2 and in rear of the operator's seat 7. To these screens the grain is delivered by a suitable elevator 8 in a direction transversely of the screens and above the upper screen and at the front end thereof at a point slightly above the fan outlet.

In the form of my improved construction shown in Figs. 1 and 2, a laterally disposed distributing member 9, having a plurality of downwardly inclined spaced teeth 10, is disposed above the upper screen 3 and connected through a pitman 11 with an eccentric 12 rotatable with the conveyer or elevator 8. As shown, the opposite end of this member 9 is pivotally connected at 13 to the lower end of a depending pivoted link 14 pivoted at 15 to the upper arm of a bell crank lever 16, in turn fixed at 17 to the rear end of a longitudinally disposed rod 18 journaled in the casing. As shown, this bell crank 16 is movable in a transverse plane and has its lower arm connected, through a transversely disposed link 19, with a downwardly inclined deflector 20 of rearwardly and laterally curved or dished conformation disposed across the path of the grain delivered by the elevator 8 and deflecting the same downward, this deflector being pivoted at 21 to the top of the separator casing at a point adjacent the point of elevator discharge. In order that the several elements may be conveniently adjusted, a crank 22 is formed on the end of the rod 18 and the latter is extended forward to a point above the fan casing 6 and within easy reach of the operator on the seat 7, this crank 22 being engageable with a notched holding plate 23.

By this construction it will be noted that the operator, by simply turning the crank 22, may vary the position of the bell crank 16 and thereby bring about a simultaneous adjustment of both the distributing member 9 and the deflecting member 20, a movement of the crank in one direction raising the link connected end of the distributer at the same time that the deflector 20 is raised, while a movement of the crank in the opposite direction lowers this end of the distributer at the same time that the deflector is lowered. Thus it will be noted that the distributer may be moved into a plurality of positions with respect to the screens so that the greater part of the grain will be delivered at any point desired on the screens, any piling up of the grain at any point on the upper screen opposite the outlet of the elevator being effectually prevented by the action of the distributer teeth 10.

In Figs. 3, 4 and 5 I have shown a modified form of the construction above described, wherein it will be noted that the distributer is of a different construction, comprising a substantially vertical back member 24 having substantially horizontally disposed spaced teeth 25 extending from the lower part thereof. In this construction the distributer member is connected to an eccentric 26 on the conveyer mechanism through a pitman 27 as in the previous construction, but the opposite end of the same is pivotally connected at 28 to a depending, preferably resilient, support 29 fastened to the top of the conveyer casing. It will also be noted that in this construction the deflector comprises a manually movable deflector member 30 having an adjusting handle 31 journaled in brackets 32 and adjustable into position in any one of a plurality of notches 33 formed on an arcuate holding member 34, likewise attached to the top of the separator casing. In the operation of this mechanism it will, of course, be understood that as the grain is delivered from the conveyer to the distributer member it will be spread upon the surface of the screen by the latter in substantially the same manner as in the first form of the invention above described, and that the deflector 27 will operate to deflect the grain to the distributer in substantially the same manner as above described, the only substantial difference being the independent adjustment of the member 27.

While I have in this application specifically described one embodiment which my invention may assume in practice, it is, of course, to be understood that this form thereof is used for purposes of illustration and that the invention may be modified and embodied in other forms without departing from its spirit, and that it is my intention to include all such modifications within the scope of the appended claims.

What I claim as new is:

1. In combination, a separator casing, a screen therein, an elevator, a distributer disposed above said screen and located in the path of the grain delivered by said elevator to distribute the material while upon the screen, and means directly connected to a moving part of said elevator for reciprocating said distributer relative to said screen.

2. In combination, a separator casing, a screen therein, an elevator, a swinging distributer disposed above said screen, means connected to the elevator for moving said distributer relative to said screen, and a deflector disposed across the path of the grain delivered by said elevator.

3. In combination, a separator casing, a screen therein, an elevator, a swinging distributer disposed above said screen, means connected to the elevator for moving said distributer relative to said screen, and an adjustable deflector disposed across the path of the grain delivered by said elevator.

4. In combination, a separator casing, a screen therein, an elevator, a swinging distributer disposed above said screen, means connected to the elevator for moving said distributer relative to said screen, a deflector disposed across the path of the grain delivered by said elevator, and means for adjusting said deflector and distributer.

5. In combination, a separator casing, a screen therein, an elevator, a swinging distributer disposed above said screen, means connected to the elevator for moving said distributer relative to said screen, a deflector disposed across the path of the grain delivered by said elevator, and means for adjusting said deflector and distributer in one operation.

6. In combination, a separator casing, a screen therein, an elevator delivering grain into said casing, a distributer intermediate the elevator and the screen receiving grain from said elevator and disposed above said screen, an eccentric connected to said elevator, a pitman connecting said eccentric to one end of said distributer, and a swinging connection between the opposite end of said distributer and said casing.

7. In combination, a separator casing, a screen therein, an elevator delivering material to said casing, a distributer disposed above said screen and receiving material from said elevator, means for producing relative movement between said screen and distributer, and means disposed above said distributer and in the path of the grain delivered from said elevator for deflecting the grain downwardly.

8. In combination, a separator casing, a screen therein, an elevator delivering material to said casing, a distributer disposed above said screen and receiving material from said elevator, means for producing relative movement between said screen and distributer, a dished deflector disposed above said distributer and in the path of the grain delivered from said elevator, and means for adjusting the angular position of said deflector.

9. In combination, a separator casing, a screen therein, an elevator delivering material to said casing, a distributer disposed above said screen and receiving material from said elevator, means for moving said distributer relative to said screen, a deflector disposed above said distributer and in the path of the grain delivered from said elevator, and means for regulating the grain retarding action of said deflector and in the same operation changing the position of said distributer.

10. In combination, a separator casing, a screen therein, an elevator delivering material to said casing, a distributer disposed above said screen and receiving material from said elevator, means for producing relative movement between said screen and distributer, a deflector disposed above said distributer and in the path of the grain delivered from said elevator, and means for simultaneously elevating said deflector and raising one end of said distributer.

11. In combination, a separator casing, a screen therein, an elevator delivering material to said casing, a distributer disposed above said screen and receiving material from said elevator, means for producing relative movement between said screen and distributer, a deflector disposed above said distributer and in the path of the grain delivered from said elevator, and means for simultaneously actuating said deflector and said distributer.

12. In combination, a separator casing, a screen therein, an elevator delivering material to said casing, a distributer disposed above said screen and receiving grain from said elevator, mechanism for operating said distributer, a pivoted deflector disposed above said distributer in the path of grain delivered from said elevator, and a bell crank having its opposite arms operatively connected to one end of said distributer and to said deflector.

13. In combination, a separator casing, a screen therein, an elevator delivering material to said casing, a distributer disposed above said screen and receiving grain from said elevator, mechanism for operating said distributer, a pivoted deflector disposed above said distributer in the path of grain delivered from said elevator, a bell crank having its opposite arms operatively connected to one end of said distributer and to said deflector, and a crank for controlling the position of said bell crank.

14. In combination, a harvester thresher frame, a separator casing thereon, a screen carried in said separator casing, a fan casing disposed in front of said separator casing, a fan therein delivering its blast over said screen, a distributer disposed above said screen, an elevator delivering material to said casing and over said distributer, means for moving said distributer relative to said screen, a deflector disposed in the path of grain delivered from said elevator to said distributer, and operative connection between said distributer and said deflector whereby upon movement of one the other is adjusted.

In testimony whereof I affix my signature.

BERT R. BENJAMIN.

Copies of this patent may be obtained for five cents each, by addressing the "Commissioner of Patents, Washington, D. C."